United States Patent [19]
Fritsch et al.

[11] Patent Number: 6,028,830
[45] Date of Patent: Feb. 22, 2000

[54] CLEANING DEVICE AND CLEANING METHOD

[76] Inventors: Joseph F. Fritsch; Roxanne Yvonne Fritsch, both of 114 Lansdowne Park, Ballsbridge, Dublin 4, Ireland

[21] Appl. No.: 08/913,294

[22] PCT Filed: Mar. 14, 1996

[86] PCT No.: PCT/IE96/00012

§ 371 Date: Sep. 15, 1997

§ 102(e) Date: Sep. 15, 1997

[87] PCT Pub. No.: WO96/28817

PCT Pub. Date: Sep. 19, 1996

[30] Foreign Application Priority Data

Mar. 14, 1995 [IE] Ireland ................................. S950187
Dec. 4, 1995 [IE] Ireland ................................. S950910

[51] Int. Cl.[7] .................................................. G11B 3/58
[52] U.S. Cl. ........................................................... 369/71
[58] Field of Search ............................. 369/71; 360/128

[56] References Cited

U.S. PATENT DOCUMENTS

| | | | |
|---|---|---|---|
| 4,180,840 | 12/1979 | Allan | 360/128 |
| 4,510,541 | 4/1985 | Sasamoto | 360/128 X |
| 4,663,686 | 5/1987 | Freeman et al. | 360/128 |
| 5,040,160 | 8/1991 | Moriya | 369/71 |
| 5,088,083 | 2/1992 | Olson | 369/71 |
| 5,117,411 | 5/1992 | Nakagawa | 369/72 |
| 5,150,268 | 9/1992 | Abe et al. | 360/128 |
| 5,268,890 | 12/1993 | Colescott | 369/71 |
| 5,351,156 | 9/1994 | Gregory et al. | 360/74.1 |
| 5,424,884 | 6/1995 | Nonaka | 360/74.1 |
| 5,612,830 | 3/1997 | Gregory et al. | 360/69 |

FOREIGN PATENT DOCUMENTS

61-237236 10/1986 Japan .
62-204441 9/1987 Japan .
1-033712 2/1989 Japan .
1-072374 3/1989 Japan .
2-232878 9/1990 Japan .
3-102607 4/1991 Japan .
4-011372 1/1992 Japan .
4-298811 10/1992 Japan .
4-302830 10/1992 Japan .
4-332923 11/1992 Japan .
5-047021 2/1993 Japan .
5-089438 4/1993 Japan .
5-094631 4/1993 Japan .
5-094632 4/1993 Japan .
5-120713 5/1993 Japan .
5-159339 6/1993 Japan .
5-020295 1/1994 Japan .
6-020295 1/1994 Japan .
6-036323 2/1994 Japan .
6-203402 7/1994 Japan .
6-267098 9/1994 Japan .
7-029197 1/1995 Japan .

*Primary Examiner*—William J. Klimowicz
*Attorney, Agent, or Firm*—Sughrue, Mion, Zinn, Macpeak & Seas, PLLC

[57] ABSTRACT

A cleaning device (1) for cleaning a lens (2) of a laser head (3) of a compact disc player comprises a carrier disc (5) which is substantially similar to a standard compact disc. Cleaning brushes (14) and (15) are located on the carrier disc (5) on a face (6) thereof which, in use, faces the laser head (3) for cleaning the lens (2) as the carrier disc (5) rotates in the compact disc receiving location of the compact disc player. A non-reflective band (25) is printed on and extends around the outer periphery (12) of the carrier disc (5) for returning the laser head (3) from the outer periphery (12) of the carrier disc (5) to an inner periphery (11), so that as the laser head (3) cycles between the inner and outer peripheries (11) and (12) across the brushes (14) and (15), the brushes (14) and (15) engage the lens (2) in two different relative directions for cleaning thereof.

36 Claims, 5 Drawing Sheets

CLEANING DEVICE AND CLEANING METHOD

The present invention relates to a cleaning device and to a method for cleaning a lens of an optical head or heads, typically, a laser head or heads of an optical disc player and/or recorder unit.

There are many types of optical disc player and/or recorder units, a typical unit is a compact disc player. Other such units, for example, are used for reading data from CD-ROMs, and also for writing data onto CD-ROMs. Another type of optical disc player and/or recorder unit records and plays video signals. Indeed, recordable compact discs are now becoming quite common both in the field of audio and video and computers. Compact disc player/recorder units are also being provided for recording onto and playing from such compact discs.

All such player and/or recorder units, comprise an optical disc receiving location into which an optical disc is placed, and a rotatably mounted drive spindle within the receiving location engages the disc for rotation thereof. An optical head, which comprises a laser light source from which laser light is directed onto the disc comprises a lens through which the laser light is focused and directed onto the optical disc. Reflected light from the optical disc is received by the optical head, and the reflected light contains signals which are recorded on the optical disc. The optical head is moveable radially relative to the rotational axis of the drive spindle from an inner position relative to the optical disc to an outer position. The inner position is located relatively closely to the drive spindle axis, and coincides with the inner periphery of the recorded area of an optical disc. The outer position coincides with the outer periphery of the recorded area of an optical disc. It is important that the lens of the optical head be kept clean.

Cleaning devices for cleaning the lens of an optical head of an optical disc player and/or recorder unit are known. A common type of such cleaning device comprises a standard optical disc, and in the case of a compact disc player, a standard compact disc is provided for placing in the optical disc receiving location of the player. One or two relatively narrow radially extending brushes are located in the compact disc, and extend from the surface of the disc which faces the optical head for wiping and cleaning the lens of the optical head as the disc rotates. In general, such radially arranged brushes, as well as being relatively narrow in a circumferential direction, extend for a relatively short distance in a radial direction. The brushes are generally equi-spaced circumferentially around the disc, and are located in various positions, generally, between the inner and outer peripheries of the recorded area of a normal compact disc. Thus, as the disc rotates, the brush or brushes are urged in a circumferential cleaning path or paths around the axis of rotation of the disc, and when the optical head is in a position which corresponds to the path of movement of one of the brushes, as the positions of the brush and the optical head coincide, the brush wipes across the lens in a generally circumferential direction relative to the direction of rotation of the disc for cleaning the lens. That is provided that the length of the fibres of the brush or brushes extending from the surface of the disc is sufficient to contact the lens. Typical of such cleaning devices are those which are sold under the Trade Marks ALCON model CD-16, ALLSOP model 56,500, MAXELL model CD-345, and DISCWASHER model CDL2.

In order that the optical head passes beneath the path or paths of the brushes when the cleaning device is rotating in the normal compact disc receiving location, the user instructs the optical head to read a track of the disc which is at a radius greater than the radius at which the brushes are located. This causes the optical head to move radially from the inner position which the optical head normally takes up, outwardly to the selected track. As the optical head moves to the selected track, the optical head crosses the cleaning path of the brush or brushes, and should the brush and the optical head come into contact, the lens is cleaned by the brush or brushes. This, of course, is provided that the optical head is engaged by a brush or brushes as the optical head crosses the cleaning path of the brush or brushes.

Such cleaning devices only provide for a single pass of the optical head beneath the path of the brushes, and thus, at best the brushes engaged the optical head once moving in one direction only. In other words, the direction of the relative movement between the brushes and the optical head is in the same direction at all times during cleaning of the lens. This, thus, limits the capacity of the brushes to clean the lens. Additionally, due to the relatively narrow circumferential width of the brushes, the cleaning capacity of the brushes is further restricted. Furthermore, because of the relatively narrow circumferential width of the brushes and the relative speed of the brushes and the optical head while the compact disc is rotating and the optical head is moving in a radially direction in many instances, the optical head passes the circumferential path of the brush or brushes, without coming into contact with any brush, and thus, no cleaning contact takes place between the brush or brushes and the lens of the optical head.

A further disadvantage of known cleaning devices is that the length of the fibres of the cleaning brushes, in general, is relatively short, and in a large number of cases, the fibres are of insufficient length to contact the lens of the optical head.

There is therefore a need for a method and a cleaning device for cleaning a lens of an optical head of an optical disc player and/or recorder unit which overcomes these problems.

The present invention is directed towards providing such a method and a cleaning device.

According to the invention there is provided a method for cleaning a lens of an optical head of an optical disc player and/or recorder unit, the method comprising the steps of inserting a cleaning device into an optical disc receiving location of the player and/or recorder unit, the cleaning device comprising a carrier means for placing in the optical disc receiving location and a cleaning means associated with the carrier means, the method further comprising the step of urging at least one of the optical head and the cleaning means to move relative to the other with the cleaning means co-operating with the optical head for cleaning the lens thereof, wherein the direction of relative movement between the optical head and the cleaning means is initially in a first direction, and then in a second direction, the second direction being different to the first direction.

In one aspect of the invention at least one of the optical head and the cleaning means is moved relative to the other for causing at least two cycles of relative movement in the first direction and the second direction. Preferably, at least one of the optical head and the cleaning means is moved relative to the other for causing a plurality of cycles of relative movement in the first direction and the second direction.

In one aspect of the invention the carrier means is rotated in the optical disc receiving location about an axis of rotation by a drive spindle in the optical disc receiving location for causing the cleaning means to describe a circumferential cleaning path of movement extending around the rotational axis of the carrier means. In another aspect of the invention the optical head is moved in a radial direction relative to the rotational axis of the carrier means.

Preferably, the optical head is initially moved in a first radial direction for providing the relative movement in the first direction between the optical head and the cleaning means, and then the optical head is moved in a second radial direction opposite to the first radial direction for providing the relative movement in the second direction.

Alternatively or additionally at least one of the optical head and the cleaning means is moved transversely relative to the plane of movement of the carrier means for providing the relative movement between the optical head and the cleaning means in the first and second directions, for example, the relative movement in the first and second directions between the optical head and the cleaning means is towards and away from the cleaning means.

In a further aspect of the invention the relative movement between the optical head and the cleaning means in the first and second directions causes the optical head to move into and out of the cleaning means. To achieve the relative movement in the first and second directions between the optical head and the cleaning means transversely of the plane of movement of the carrier means, ideally, the optical head is moved relative to the carrier means transversely of the plane of movement of the carrier means.

In general, the relative movement of the optical head and the cleaning means transversely relative to the plane of movement of the carrier means is controlled by the optical disc player and/or recorder unit.

In one aspect of the invention the relative movement in the first and second directions of the optical head and the carrier means is controlled by the optical disc player and/or recorder unit in response to an instruction provided to the optical disc player and/or recorder unit. Preferably, the instruction provided to the player and/or recorder unit instructs the optical head to move to a predetermined location on the carrier means, for causing the optical head to move across the circumferential path described by the cleaning means for providing the relative movement in the first direction.

In another aspect of the invention a further instruction is provided to the optical disc player and/or recorder unit for returning the optical head from the predetermined location to return across the circumferential path described by the cleaning means for providing the relative movement in the second direction. Preferably, the further instruction is such as to cause the optical disc player and/or recorder unit to cycle the optical head across the cleaning path described by the cleaning means for causing cycling of the relative movement in the first and second directions.

In another aspect of the invention a still further instruction is provided to the optical disc player and/or recorder unit for returning the optical head across the circumferential path described by the cleaning means to the predetermined location for causing the relative movement again in the first direction.

In general, the instruction for returning the optical head from the predetermined location for causing the movement in the second relative direction is provided on the carrier means.

In one aspect of the invention the optical head is returned from the predetermined location by a code on the carrier means which is read by the optical head. Preferably, the code is an optical code. Advantageously, the code is a digital code. Ideally, the instruction is in the predetermined location.

In another aspect of the invention the optical head is returned after crossing the circumferential cleaning path described by the cleaning means to cause the relative movement of the optical head and the cleaning means in the second direction by a means for preventing reflection of sufficient light from the carrier means so that a readable signal is not received by the optical head. Preferably, the means for preventing the reflection of light from the carrier means comprises a non-reflective means on the carrier means. Advantageously, the non-reflective means is provided on the carrier means adjacent the predetermined location which is provided by a predetermined track.

Alternatively, the instruction for controlling the movement of the optical head and the carrier means is a software instruction. Preferably, the software instruction is provided on the carrier means. Advantageously, the software instruction comprises two instructions, a first instruction recorded on the carrier means at a first location on one side of the cleaning path described by the cleaning means for instructing the optical head to move to a second location on the opposite side of the cleaning path described by the cleaning means for providing the relative movement in the first direction, the second instruction being provided at the second location for returning the optical head to the first location for providing the relative movement in the second direction. Preferably, a plurality of spaced apart first instructions and a plurality of spaced apart second instructions are recorded at the respective first and second locations of the carrier means.

Additionally the invention provides a cleaning device for cleaning a lens of an optical head of an optical disc player and/or recorder unit, the cleaning device comprising a carrier means for placing in an optical disc receiving location of the optical disc player and/or recorder unit, and a cleaning means associated with the carrier means for cleaning the lens when at least one of the optical head and the cleaning means is moved relative to the other with the cleaning means co-operating with the optical head for cleaning the lens thereof, wherein the relative movement between the optical head and the cleaning means is initially in a first direction, and then is in a second direction, the second direction being different to the first direction.

In one aspect of the invention a means for causing change in relative movement of the optical head and the cleaning means between the first and second directions of relative movement is associated with the carrier means.

In one aspect of the invention the means for causing the change in relative movement of the optical head and the cleaning means between the first and second directions is located on the carrier means.

Preferably, the means for causing the change in relative movement of the optical head and the cleaning means of the optical head and the cleaning means between the first and second directions causes the optical head and the cleaning means to carry out at least two cycles of relative movement in the first and second directions. Advantageously, the means for causing the change in relative movement of the optical head and the cleaning means between the first and second directions causes the optical head and the cleaning means to carry out a plurality of cycles of relative movement in the first and second directions.

In one aspect of the invention the means for changing the direction of relative movement of the optical head and the cleaning means between the first and second directions comprises a means for changing the direction of relative movement from the first direction to the second direction.

In another aspect of the invention the means for changing the direction of relative movement of the optical head and the cleaning means between the first and second directions comprises a means for changing the direction of relative movement from the second direction of relative movement to the first direction of relative movement.

In another aspect of the invention the means for changing the direction of relative movement of the optical head and the cleaning means between the first and second directions comprises a means for causing the optical disc player and/or recorder unit to change the direction of relative movement of the optical head and the cleaning means.

In a further aspect of the invention the carrier means defines a central axis and is engagable with a drive spindle in the optical disc receiving location of the optical disc player and/or recorder unit with the central axis of the carrier means coinciding with the rotational axis of the drive spindle for rotation of the carrier means.

Preferably, the carrier means comprises a carrier disc of substantially similar dimensions to those of an optical disc for which the optical disc receiving location is adapted to receive.

Advantageously, the cleaning means is provided on the carrier disc at a location which is radially between an inner periphery and an outer periphery of an annular area of the carrier disc which corresponds to a normal recorded area of an optical disc. Preferably, the cleaning means is spaced apart from the respective inner and outer peripheries.

In one aspect of the invention a reflective means for reflecting light from the optical head is provided on the carrier disc.

In another aspect of the invention the means for causing the change in relative movement of the optical head and the cleaning means between the first and second directions comprises a means for preventing reflection of sufficient light from the carrier disc so that a readable signal is not received by the optical head. Advantageously, the means for preventing reflection of light from the carrier disc comprises an non-reflective means on the carrier disc. Preferably, the non-reflective means comprises an elongated non-reflective band located on the carrier disc and extending in a generally circumferential direction. In one aspect of the invention the elongated non-reflective band extends completely circumferentially around the carrier disc.

In another aspect of the invention the non-reflective means is located on the carrier disc between the cleaning means and the outer periphery.

In another aspect of the invention the non-reflective means is located adjacent the outer periphery.

Alternatively, the non-reflective means comprises at least one non-reflective segment, and preferably, a plurality of spaced apart non-reflective segments, which may be equi-spaced apart or non-equally spaced apart.

In one aspect of the invention the spaced apart non-reflective segments are joined by the non-reflective band.

Alternatively, and/or in addition, the cleaning means acts as the means for preventing reflection of light from the carrier disc.

Alternatively, the means for causing the change in direction of relative movement of the optical head and the cleaning means between the first and second directions comprises an instruction means. Preferably, the instruction means is in coded form on the carrier disc. Advantageously, the instruction means comprises first and second instructions at respective spaced apart first and second locations, which are located on the carrier disc on opposite sides of the circumferential cleaning path described by the cleaning means, the first instruction at the first location causing the optical head to move to the second location, and the second instruction at the second location causing the optical head to move to the first location.

In another aspect of the invention a means for causing the optical head and the cleaning means to move relative to each other in the first and second directions is provided.

In a further aspect of the invention the means for causing the optical head and the cleaning means to move with relative movement in the first and second directions causes the optical head and the cleaning means to move with relative movement in a direction parallel to the plane of movement of the carrier means. In a further aspect of the invention the means for causing the optical head and the cleaning means to move with relative movement in the first and second directions causes the optical head and of the cleaning means to move with relative movement in a direction transversely of the plane of movement of the carrier means.

In a further aspect of the invention the means for causing the optical head and the cleaning means to move with relative movement in the first and second directions causes the optical head and the cleaning means to move with relative movement in a direction perpendicular to the plane of movement of the carrier means.

Advantageously, the means for causing the optical head and the cleaning means to move with relative movement in the first and second directions causes the optical head and the cleaning means to move with relative movement in a direction perpendicular to the plane of movement of the carrier means towards and away from the cleaning means.

In a further aspect of the invention the means for causing the optical head and the cleaning means to move with relative movement in the first and second directions causes the optical head and the cleaning means to move with relative movement in a direction perpendicular to the plane of movement of the carrier means into and out of the cleaning means.

In one aspect of the invention the means for causing the optical head and the cleaning means to move relative to each other in the first and second directions causes the optical head to move in a radial direction relative to the rotational axis of the carrier means.

In another aspect of the invention the cleaning means is located on the annular area between the inner and outer peripheries. In another aspect of the invention the cleaning means is of arcuate shape and extends partly circumferentially around the central axis of the carrier means. Preferably, the cleaning means is of dimension in a circumferential direction which is greater than its dimension in a radial direction relative to the central axis of the carrier means.

In another aspect of the invention the cleaning means extends in a general radial direction relative to the central axis of the carrier means. Advantageously, the cleaning means is of dimension in a radial direction which is greater than its dimension in a circumferentially direction relative to the central axis of the carrier means.

In another aspect of the invention at least one cleaning means of dimension in a circumferential direction greater than its dimension in a radial direction is provided, and in another aspect of the invention at least one cleaning means of dimension in a radial direction greater than its dimension in a circumferential direction is provided.

Preferably, a plurality of cleaning means are spaced apart circumferentially around the carrier means.

Advantageously, the cleaning means are equi-spaced circumferentially around the carrier means.

In one aspect of the invention the cleaning means comprises a cleaning brush. Preferably, each cleaning brush is releasably secured to the carrier means. Advantageously, each cleaning brush is surface mounted on the carrier means. Ideally, each cleaning brush comprises a plurality of cleaning fibres extending from a base member, the base member being adapted for securing to the carrier means.

In one aspect of the invention a means for securing each cleaning brush to the carrier means is provided. Preferably, the securing means comprises an adhesive coating on the base of the cleaning means.

In one aspect of the invention the cleaning fibres of each brush are of length at least 2.75 mm. Preferably, the cleaning fibres of each brush are of length at least 3.00 mm, and in one aspect of the invention the cleaning fibres are of length at least 3.25 mm, and in another aspect of the invention the cleaning fibres of each brush are of length at least 3.5 mm. In some aspects of the invention the length of the cleaning fibres of each brush are at least 3.75 mm. These dimensions would, in general, be typical for a cleaning device for a compact disc player and/or recorder unit. In general, it is believed that brushes with fibres of shorter length may be preferable for use in a cleaning device for cleaning a lens of an optical head of a CD-ROM reader.

In another aspect of the invention the base member of each brush is of a fabric, and the cleaning fibres are woven into the base member. This has the advantage that the cleaning fibres flex readily easily on coming into cleaning contact with the lens of the optical head for minimising pressure exerted by the cleaning fibres for avoiding damage to the lens and/or the optical head.

In one aspect of the invention the dimension of each cleaning means in a circumferential direction relative to the central axis of the carrier means is at least 1.75 mm.

In another aspect of the invention the dimension of each cleaning means in a circumferential direction relative to the central axis of the carrier means is at least 2.5 mm. Preferably, the dimension of each cleaning means in a circumferential direction relative to the central axis of the carrier means is at least 3 mm. Advantageously, the dimension of each cleaning means in a circumferential direction relative to the central axis of the carrier means is at least 4 mm. Ideally, the dimension of each cleaning means in a circumferential direction relative to the central axis of the carrier means is at least 5 mm.

In one aspect of the invention each means for preventing reflection of light from the carrier disc extends in a circumferential direction relative to the central axis of the carrier disc for a distance of at least 1.75 mm.

In another aspect of the invention each means for preventing reflection of light from the carrier disc extends in a circumferential direction relative to the central axis of the carrier disc for a distance of at least 2.5 mm. Preferably, each means for preventing reflection of light from the carrier disc extends in a circumferential direction relative to the central axis of the carrier disc for a distance of at least 3 mm. Advantageously, each means for preventing reflection of light from the carrier disc extends in a circumferential direction relative to the central axis of the carrier disc for a distance of at least 4 mm. Ideally, each means for preventing reflection of light from the carrier disc extends in a circumferential direction relative to the central axis of the carrier disc for a distance of at least 5 mm.

The advantages of the invention are many. In particular, the cleaning device according to the invention provides particularly good cleaning of the lens of an optical head. This particularly good cleaning action is achieved, firstly, by virtue of the fact that the optical head and the cleaning means move with relative movement in two different directions. Thus, permitting the cleaning means to approach and pass across the lens in two different relative directions, which significantly enhances the cleaning action of the cleaning means. Secondly, by virtue of the fact that the optical head makes two passes across the circumferential path described by the cleaning means, the probability of the cleaning means co-operating with the optical head for cleaning of the lens is significantly increased. By cycling the optical head a number of times in the first and second directions, the probability of the cleaning means and the optical head co-operating for cleaning of the lens is still further increased. By arranging the cleaning means to be relatively long in a circumferential direction relative to the central axis of the carrier means, the probability of the cleaning means and the optical head co-operating for cleaning of the lens of the optical head is further significantly increased. Needless to say, the greater the number of cycles in the first and second directions of relative movement between the optical head and the cleaning means, the greater will be the probability of the cleaning means cooperating with the optical head for cleaning of the lens, and furthermore, the greater the number of cycles of relative movement of the optical head and the cleaning means in the first and second directions, the greater will be the number of times the optical head and the cleaning means co-operate for cleaning of the lens. This, thus, considerably increases the cleaning action provided by the cleaning means.

By arranging the cleaning means to be relatively long in a circumferential direction relative to the central axis of the carrier means, the probability of cleaning contact between the cleaning means and the lens of the optical head is likewise also significantly increased. Indeed, by providing one or more cleaning means of a reasonable dimension in a circumferential direction relative to the central axis of the carrier means, the number of times the cleaning means comes into cleaning contact with the lens of the optical head is significantly increased, thereby providing particularly good cleaning of the lens. Additionally, by providing more than one cleaning means, and by providing the cleaning means spaced apart circumferentially around the carrier means, the probability of the cleaning means coming into cleaning contact with the lens of the optical head is significantly increased, and furthermore, the number of times the cleaning means comes into contact with the lens of the optical head is also significantly increased where the optical head and cleaning means are caused to cycle a number of times in the first and second directions of relative movement.

It is preferable that at least two cycles of relative movement between the optical head and the cleaning means in the first and second directions be carried out, and preferably, six cycles of relative movement between the optical head and the cleaning means should be carried out.

Many means for causing the optical head and the cleaning means to cycle in the first and second relative directions of movement may be used, however, in a cleaning device for a compact disc, in general, it is preferable that the means for causing the cycling should be provided by an non-reflective means located on the carrier means which prevents reflection of sufficient light to the laser head so that a readable signal is not received by the laser head. This thus, causes the laser head to cycle between the non-reflective means and the inner periphery of the annular area of the carrier means. In the case of a cleaning device for cleaning a CD-ROM reader, it is advantageous to provide the means for causing the cycling of the relative movement in the first and second directions between the optical head and the cleaning means by way of instruction recorded onto the carrier means and preferably, the instructions should be located on respective opposite sides of the cleaning means.

By surface mounting each cleaning brush on the surface of the carrier means cleaning fibres of the brushes can flex from the base of the brush. Additionally, by weaving the cleaning fibres into the base member of the brush, where the base member is provided by a fabric, the cleaning fibres can effectively pivot about the warps of the fabric. This also provides for easy flexing of the cleaning fibres, which in turn minimises the pressure with which the cleaning fibres act on the lens of the optical head, for in turn minimising any likelihood of damage to the lens or the optical head, which are relatively sensitive components.

The invention will be more clearly understood from the following description of some preferred embodiments thereof which are given by way of example only with reference to the accompanying drawings, in which.

Referring to the drawings and initially to FIGS. 1 to 6, there is illustrated a cleaning device according to the invention indicated generally by the reference numeral 1 for carrying out a method, also according to the invention for cleaning a lens 2 of an optical head, in this case, a laser head 3 of an optical disc player and/or recorder unit (not shown), which in this case is a compact disc player. Such compact disc players will be well known to those skilled in the art. Briefly, such compact disc players are provided with a compact disc receiving location within which a compact disc is received and is engaged by a rotatably mounted drive spindle in the compact disc receiving location. The drive spindle rotates the compact disc about its central axis. The laser head 3 is urged radially relative to the rotational axis of the compact disc over a recorded area on the compact disc from an inner periphery of the recorded area to an outer periphery of the recorded area. Such compact disc players are used for entertainment, for example, for playing music and the like. They may also be used for reading CD-ROMs and the like. The cleaning device 1 as well as being suitable for cleaning the lens 2 of a laser head 3 of a compact disc player, is also suitable for cleaning the lens of an optical head of other types of optical disc player and/or recorder units, such as, for example, an audio and/or video player and/or recorder unit, a CD-ROM reader/writer unit and the like. The uses to which the cleaning device 1 according to the invention may be put will be well known to those skilled in the art. However, for convenience, the cleaning device 1 will be described in this embodiment of the invention for cleaning the lens 2 of the laser head 3 of a compact disc player.

Figure 1:
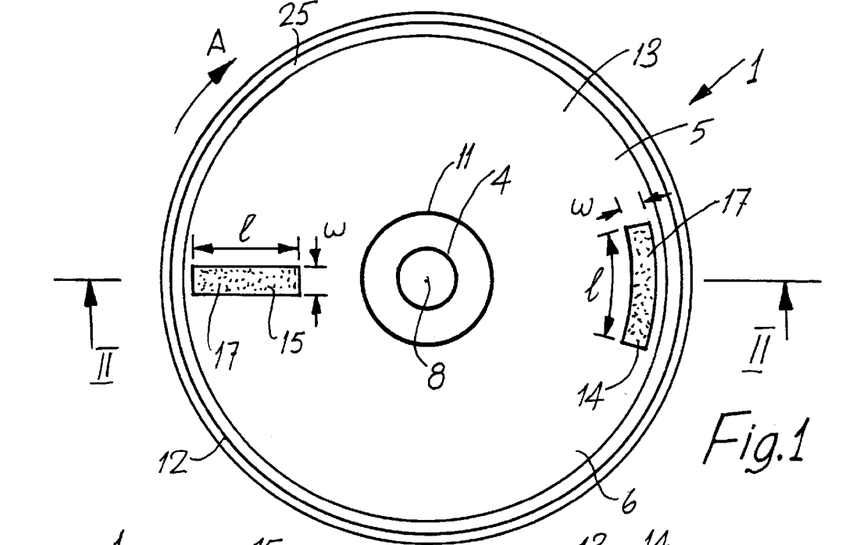
FIG. 1 is a plan view of a cleaning device according to the invention for cleaning a lens of an optical head of an optical disc player and/or recorder unit.
Figure 2:
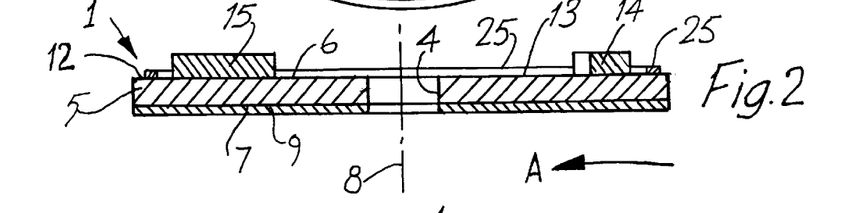
FIG. 2 is a sectional side elevational view of the cleaning device on the line II—II of FIG. 1.

The cleaning device 1 comprises a carrier means, in this case, a carrier disc 5 which is of similar shape, size and material as a standard compact disc record and defines a central axis 8. An opening 4 through the carrier disc 5 is similar to a corresponding opening in a standard compact disc, and in use engages the drive spindle in the compact disc receiving location for rotation of the carrier disc 5. The carrier disc 5 has a front face 6 and an opposite rear face 7. A reflective medium 9 is bonded to the rear face 7 as in the case of a conventional compact disc record for reflecting laser light directed onto the carrier disc 5 for reading by the laser head 3 under the control of hardware and software in the compact disc player. Inner and outer peripheries 11 and 12, respectively, correspond to inner and outer peripheries of the normal recorded area of a standard compact disc, and define an annular area 13 which corresponds to the normal recorded area. The carrier disc 5, in use, is placed in the compact disc receiving location of the compact disc player with the rear face 7 facing upwardly as in the case of a standard compact disc. Accordingly, laser light from the laser head 3 is directed upwardly through the lens 2 of the laser head 3 onto the front face 6 of the carrier disc 5 for reflection by the reflective medium 9 on the rear face 7.

A pair of cleaning means, which in this case comprise two cleaning brushes 14 and 15 for cleaning the lens 2 are located on the front face 6 of the carrier disc 5 in the annular area 13 between the inner and outer peripheries 11 and 12. The two brushes 14 and 15 are equi-spaced apart circumferentially around the carrier disc 5, in other words, at 180° intervals centre to centre around the carrier disc 5. The brush 14 is of arcuate shape and extends circumferentially relative to the central axis 8 of the carrier disc 5, and its length dimension 7 in the circumferential direction is greater than its width dimension w in the radial direction. The brush 15 extends generally radially relative to central axis 8 of the carrier disc 5 and its length dimension 7 in a radial direction is greater than its width dimension w in a circumferential direction. Both brushes 14 and 15 are arranged so that when the carrier disc 5 is rotated about its central axis 8 in the compact disc receiving location of the compact disc player by the drive spindle, the brushes 14 and 15 describe respective circumferential cleaning paths which extend around the rotational and central axis 8 of the carrier disc 5.

Figure 3:
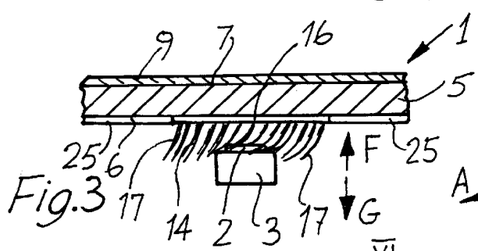
FIG. 3 is a sectional side elevational view of a portion of the cleaning device of FIG. 1 in use.
Figure 5:
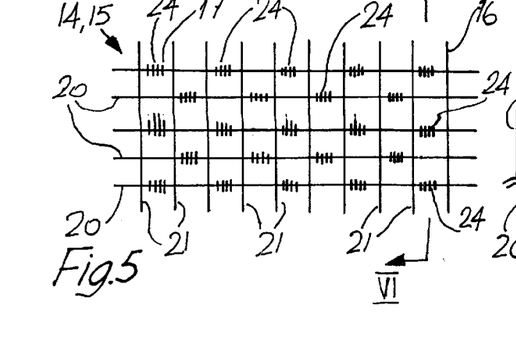
FIG. 5 is a diagrammatic plan view of a portion of the cleaning device of FIG. 1.
Figure 6:
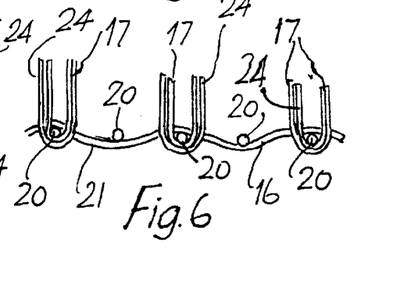
FIG. 6 is a sectional end elevational view of the portion of FIG. 5 on the line VI—VI of FIG. 5.

Each brush 14 and 15 comprises a base member 16 from which a plurality of cleaning fibres 17 extend for engaging the lens 2 with relatively light cleaning contact, see FIGS. 3, 5 and 6. The brushes 14 and 15 are surface-mounted on the front face 6 of the carrier disc 5 by bonding the base member 16 of each brush 14 and 15 to the carrier disc 5 with a suitable adhesive, preferably, an adhesive which is water-resistant. In this embodiment of the invention the base member 16 is provided with a self-adhesive backing. The fibres 17 of the brushes 14 and 15 are of sufficient length to engage the lens 2 of the laser head 3 with cleaning engagement as the laser head 3 moves past the brushes 14 and 15.

In this embodiment of the invention the bristles are of length at least 2.75 mm, and preferably, 3.75 mm.

In this embodiment of the invention the base member 16 is woven and comprises a plurality of warps 20 and wefts 21, see FIGS. 5 and 6. The fibres 17 in tufts 24 are woven into the base member 16, and are formed on the warps 20. However, to minimise loading on the drive spindle (not shown) in the optical disc receiving location as the brushes 14 and 15 engage the lens 2, and to minimise pressure of contact of the fibres 17 on the lens, the tufts 24 are located on alternate warps 20 between the wefts 21, and furthermore, the tufts 24 are located on the warps 20 between alternate pairs of wefts 21. This, thus, permits greater flexing of the fibres 17 as the brushes 14 and 15 engage the lens 3, thereby minimising the power required to drive the carrier disc 5, and the contact pressure of the fibres 17 on the lens 2. The greater flexing of the fibres 17 is facilitated by virtue of the fact that in each alternate warp 20 a tuft 24 of fibres 17 is missing, as one moves along between each pair of wefts 21, and also as one moves along each warp 20. Additionally, the fibres 17 can pivot about the warps 20 which further minimises contact pressure of the fibres 17 on the lens 2 and the laser head 3 for avoiding damage to the laser head 3.

A means for causing the laser head 3 to cycle radially outwardly and inwardly between the inner and outer peripheries 11 and 12, in a first radial direction outwardly and in a second radial direction inwardly relative to the central and rotational axis 8 of the carrier disc 5 comprises a means for preventing reflection of laser light from the carrier disc 5, which in this case is provided by a non-reflective means, namely, a non-reflective band 25. The non-reflective band 25 is black and opaque and is printed on the front face 6 of the carrier disc 5 and extends completely around the carrier disc 5 adjacent the outer periphery 12, but within the annular area 13 for preventing reflection of laser light from the carrier disc 5 adjacent an outer track thereof. The non-reflective band 25 is located radially outwardly from the brushes 14 and 15. In this embodiment of the invention the annular area 13 is divided into nine tracks, track IX being covered with the non-reflective band 25. The inner-most track adjacent the inner periphery 11 on the annular area 13 contains data and information on the number of tracks and their location on the carrier disc 5. Accordingly, when the carrier disc 5 is placed in the compact disc receiving location of a compact disc player, and the play button is operated, the laser head 3 moves from its normal rest position adjacent the inner periphery 11 of the carrier disc 5 to the inner-most data track adjacent the inner periphery 11. The laser head 3 reads the number of tracks and their respective locations from the data track. By requesting the compact disc player to play track IX, the laser head 3 moves radially outwardly from the inner periphery 11 to track IX which is at the outer periphery 12. On reaching track IX and failing to receive a signal due to the absence of reflected light, the laser head 3 is returned to the inner-most data track to seek confirmation of the position of track IX. On receiving the confirmation, the laser head 3 is again moved to track IX, and this procedure continues, depending on the compact disc player. In some compact disc players, the compact disc player shuts down after a predetermined number of cycles of the laser head 3 from the inner-most data track to track IX and back again to the inner-most data track. The predetermined number of cycles could typically be six cycles. In other compact disc players, the laser head 3 continues to cycle from the inner-most data track to track IX and back again to the inner-most data track until the user operates the stop-switch of the compact disc player. In which case the laser head 3 remains in the position it occupied when the stop switch was operated. On the carrier disc 5 being ejected, the laser head 3 returns to its rest position adjacent the inner periphery 11.

Figure 4:
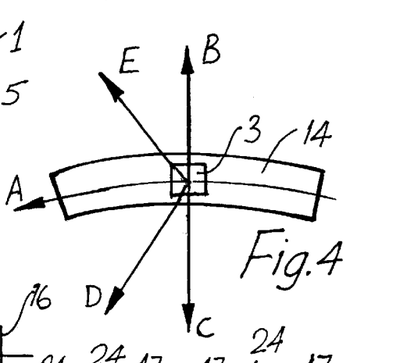
FIG. 4 is a plan view of portion of the cleaning device of FIG. 1 also in use.

When rotated in the compact disc receiving location, the carrier disc 5 rotates in the direction of the arrow A when viewed from beneath looking upwardly, see FIG. 4. This movement of the carrier disc 5 causes the brushes 14 and 15 to move in the direction of the arrow A also. Thereby, the brushes 14 and 15 describe circumferential cleaning paths around the rotational axis 8 of the carrier disc 5. As the laser head 3 is moved radially outwardly in the first direction from the inner periphery 11 to the outer periphery 12, namely, in the direction of the arrow B, the laser head 3 crosses the cleaning paths of the cleaning brushes 14 and 15, and thereby, the brushes 14 and 15 engage the lens 2 with a cleaning action. Likewise, when the laser head 3 is returned radially in the second direction from the outer periphery 12 to the inner periphery 11 in the direction of the arrow C, see FIG. 4, the laser head 3 also crosses the cleaning paths described by the brushes 14 and 15 so that the brushes 14 and 15 contact the lens 2 a second time with cleaning action. The relative movement between the laser head 3 and the cleaning brushes 14 and 15 as the laser head 3 moves in the first radial direction, in other words, in the direction of the arrow B is in a first direction, namely, in the direction of the arrow D. On the laser head 3 being returned in the second radial direction C, the direction of relative movement between the laser head 3 and the brushes 14 and 15 is in a second direction, namely, the direction of the arrow E, see FIG. 4. Thus, the non-reflective band 25 causes the compact disc player to cycle the laser head 3 in the directions of the arrows C and B for a number of cycles, and during cycling of the laser head 3, the direction of relative movement between the laser head 3 and the brushes 14 and 15 is changed from a first direction of relative movement, namely, movement in the direction of the arrow D to a second direction of relative movement, movement in the direction of the arrow E, and so on until either the compact disc player stops the laser head 3 from cycling, or an operator operates the stop-switch for the same purpose. Additionally, the direction of relative movement of the laser head 3 and the brushes 14 and 15 in the first direction D is different to the direction of relative movement in the second direction F.

Accordingly, the cleaning brushes 14 and 15 act on the lens 2 of the laser head 3 in two different cleaning directions, thereby, ensuring good and thorough cleaning of the lens 2.

In general, in compact disc players which do not automatically stop the cycling of the laser head 3 after a predetermined number of cycles, for example, six cycles as mentioned above, it is recommended that the laser head 3 should be allowed to cycle through at least two cycles, and preferably, at least six cycles of movement from the inner track 11 to the outer track 12 and back to the inner track 11 for good cleaning of the lens 2.

It has also been observed that in some compact disc players, the laser head 3, when returning in the second direction, namely, the direction of the arrow C, does not always return to the inner periphery 11. In some instances, after crossing the cleaning paths of the brushes 14 and 15 moving in the second direction, the laser head 3 stops and begins to move radially outwardly in the first direction, namely, the direction of the arrow B. Why this phenomenon should occur, is not fully understood, it is believed that the provision of the brushes 14 and 15, in particular, the circumferentially extending brush 14, by preventing reflection of light to the laser head 3, may confuse the laser head 3, and thereby cause it again to change direction to move in the first direction towards track IX and the non-reflective band 25.

In other compact disc players, it has been observed that a combination of the two different types of cycling of the laser head 3 occur. In some cycles the laser head 3 returns completely in the second direction to the inner-most data track, while in other cycles the laser head 3 returns in the second direction only to cross the cleaning paths of the cleaning brushes, and then moves in the first direction to track IX.

Another phenomenon which has been observed in some compact disc players is that when the laser head 3 reaches the cleaning brushes 14 and 15, the laser head moves upwardly and downwardly in the directions of the arrows F and G, respectively, in other words, transversely to the rotational plane of the carrier disc 5, see FIG. 3. This causes the lens 2 of the laser head 3 to move into and out of the brushes 14 and 15 for cleaning of the lens 2. In normal use of a compact disc player, this facility for up and down movement of the laser head is provided for facilitating focusing of the laser head for beaming and receiving the laser light. It is therefore believed that when the laser head 3 fails to receive a readable signal due to the absence of reflected light when the laser head 3 comes into contact with the brushes 14 and 15, the laser head 3 is urged upwardly and downwardly in an attempt to focus the laser head 3 in an attempt to find laser light. This upward and downward movement of the laser head 3 has a further beneficial cleaning effect, in that further relative movement between the laser head 3 and the brushes 14 and 15 is induced in respective first and second directions, namely, upwardly and downwardly relative to the brushes 14 and 15, thereby further providing cleaning action in further different relative directions of movement of the laser head 3 and cleaning brushes 14 and 15.

This phenomenon of upward and downward movement of the laser head 3 into and out of the brushes 14 and 15 has been observed in some compact disc players in combination with the other two types of cycling which have been described already, in other words, cycling of the laser head 3 in the first and second directions B and C between the inner and outward peripheries 11 and 12, and partly between the inner and outer peripheries 11 and 12.

Data, such as, instructions for using the cleaning device 1 may also be recorded on the tracks between track I and track IX. For example, instructions on use of the cleaning device 1 may be recorded on different tracks in different languages, and other relevant information for carrying out other care operations for the compact disc player may be recorded on the tracks. It will of course be appreciated that many of the tracks between tracks I and IX may be left unrecorded.

In use, the cleaning device 1 is loaded into the compact disc receiving location of a compact disc player with the front face 6 and the brushes 14 and 15 facing downwardly towards the laser head 3. The compact disc player is operated in play mode and track IX is selected. The laser head 3 reads the inner data track adjacent the inner periphery 11 and the number of tracks and their respective locations is stored in memory in the compact disc player. The laser head 3 is then moved by the compact disc player in the first radial direction to track IX, and on crossing the cleaning paths described by the brushes 14 and 15, the cleaning brushes 14 and 15 contact the lens 2 of the laser head 3 with relative movement in the first direction, namely, in the direction of the arrow D for cleaning of the lens 2. On the laser head 3 failing to receive a signal due to the absence of reflected light from track IX, the laser head 3 is moved by the compact disc player in the second radial direction, namely, the direction of the arrow C back towards the inner periphery 11. In this direction, the laser head 3 crosses the cleaning paths described by the brushes 14 and 15 which contact the lens 2 of the laser head 3 with relative movement in the second direction, namely, in the direction of the arrow E for cleaning the lens 2 in that direction. As described above, the laser head 3 may return to the inner data track adjacent the inner periphery 11, and then be returned to track IX, or may stop at a position intermediate the cleaning brushes 14 and 15 and the inner periphery 11 and then be returned in the second direction to track IX. Additionally, as discussed above, on the laser head 3 being directly below the brushes 14 and 15, the laser head 3 may be moved upwardly and downwardly for focusing of the laser head 3, thereby providing additional relative movement between the laser head 3 and the brushes 14 and 15 for further enhanced cleaning of the lens 2 of the laser head 3. Depending on the compact disc player, the compact disc player may shut off after a predetermined number of cycles of the laser head 3, typically, six. Alternatively, the compact disc player may continue to cycle the laser head 3 backwards and forwards in the first and second directions until the user shuts off the compact disc player.

Figure 7:
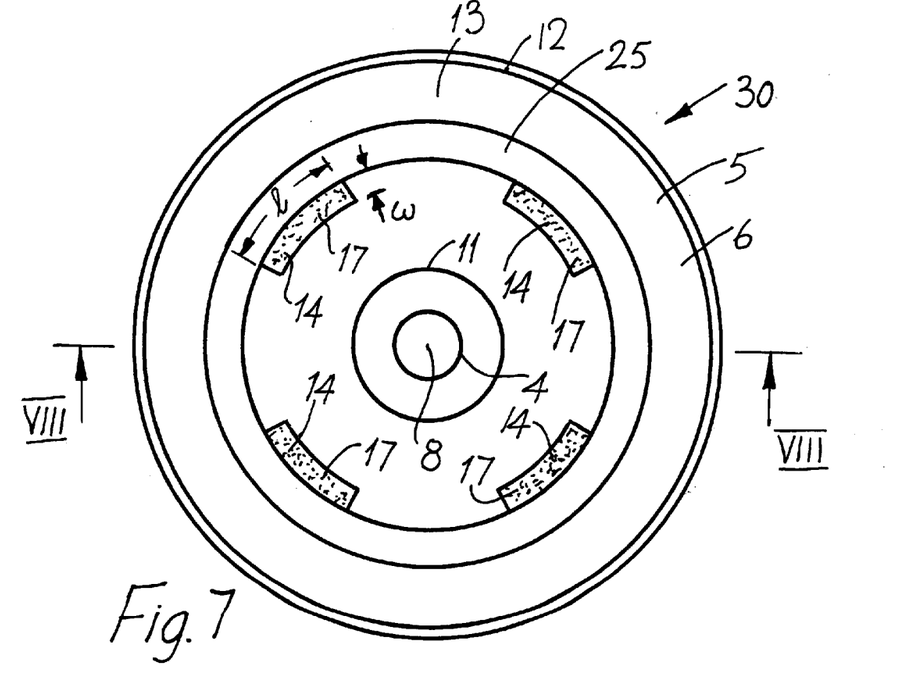
FIG. 7 is a plan view similar to FIG. 1 of a cleaning device according to another embodiment of the invention.
Figure 8:
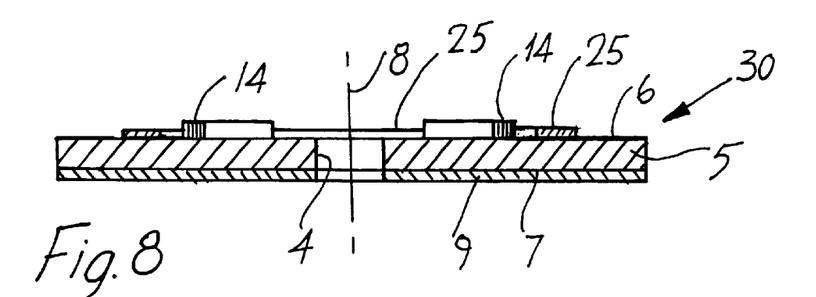
FIG. 8 is a sectional side elevational view similar to FIG. 2 on the line VIII—VIII of FIG. 7 of the cleaning device of FIG. 7.
Figure 9:
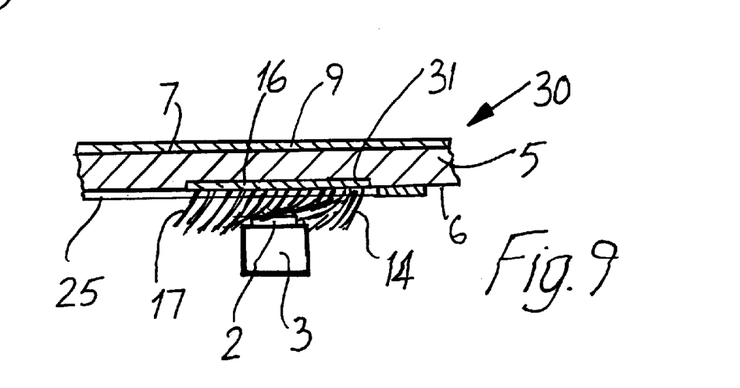
FIG. 9 is a sectional side elevational view similar to FIG. 3 of the cleaning device of FIG. 7.

Referring now to FIGS. 7 to 9, there is illustrated a cleaning device indicated generally by the reference numeral 30 according to another embodiment of the invention for cleaning a lens 2 of a laser head 3 of a compact disc player. The cleaning device 30 is substantially similar to the cleaning device 1, and similar components are identified by the same reference numerals. The main difference between the cleaning device 30 and the cleaning device 1 is that, in the cleaning device 30 four identical arcuate cleaning brushes 14 are equi-spaced circumferentially around the carrier disc 5 at the same radius from the central axis 8 of the carrier disc 5. The brushes 14 are substantially similar to the brushes 14 of the cleaning device 1, and are of length dimension l in a circumferential direction which is considerably greater than their width dimension w in a radial direction. The brushes 14 are located in recesses 31. In this embodiment of the invention the non-reflective band 25 extends completely around the carrier disc 5, but is located adjacent the brushes 14 and is spaced apart from the outer periphery 12 of the annular area 13 of the carrier disc 5. In this embodiment of the invention the non-reflective band 25 coincides with a track which is designated as track V. In this embodiment of the invention, when the cleaning device 30 is placed in the compact disc receiving location of a compact disc player, track V is selected instead of track IX as in the case of the cleaning device 1. This thus causes the laser head 3 to cycle in the respective first and second directions, namely, radially outwardly and radially inwardly across the cleaning path described by the brushes 14 as already described with reference to the cleaning device 1 of FIGS. 1 to 6.

Otherwise operation of the cleaning device 30 is similar to that of the cleaning device 1.

Figure 10:
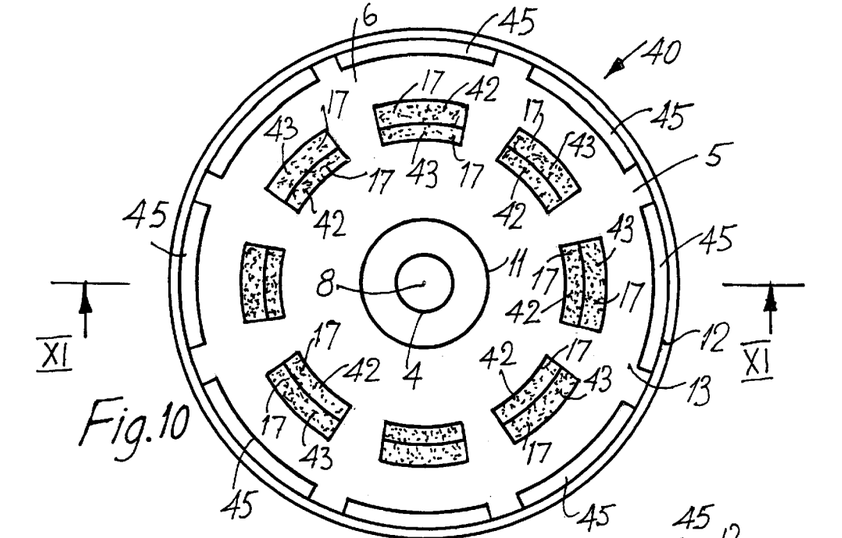
FIG. 10 is a plan view similar to FIG. 1 of a cleaning device according to another embodiment of the invention.
Figures 11, 18, 19:
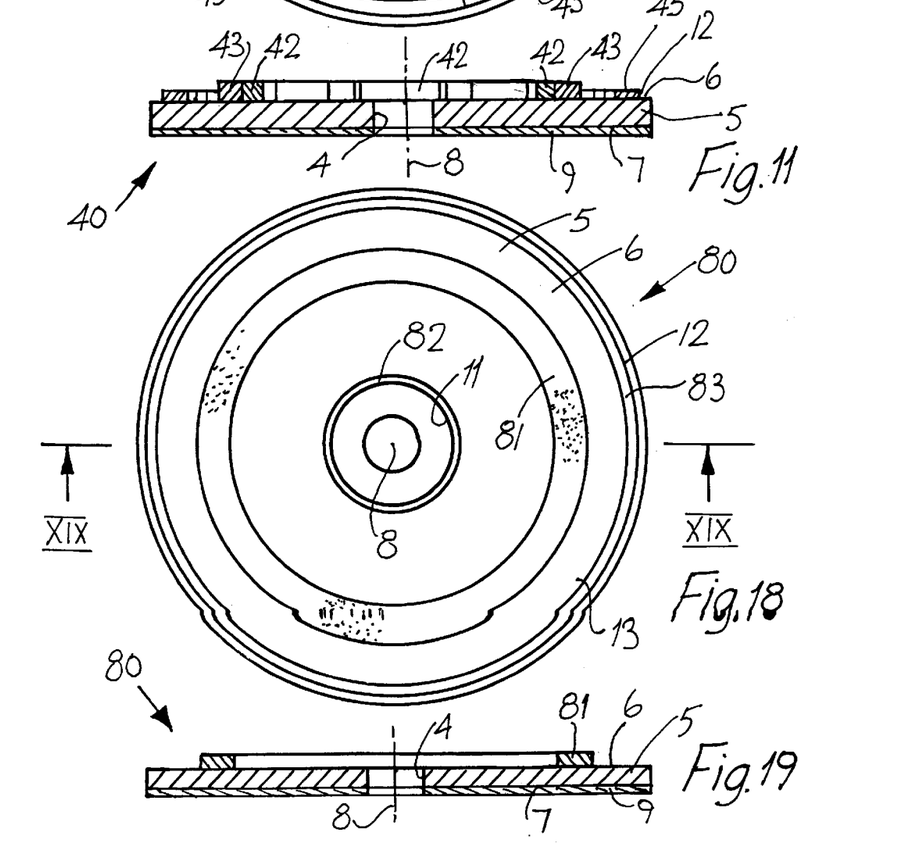
FIG. 11 is a sectional side elevational view similar to FIG. 2 of the cleaning device of FIG. 10 on the line XI—XI of FIG. 10.
FIG. 18 is a plan view similar to FIG. 1 of a cleaning device according to a still further embodiment of the invention.
FIG. 19 is a sectional side elevational view similar to FIG. 2 of the cleaning device of FIG. 18 on the line XIX—XIX of FIG. 18.

Referring now to FIGS. 10 and 11, there is illustrated a cleaning device 40 according to another embodiment of the invention for cleaning the lens 2 of a laser head 3 of a compact disc player. The cleaning device 40 is substantially similar to the cleaning device 1, and similar components are identified by the same reference numerals. In this embodiment of the invention the cleaning means comprises, eight inner cleaning brushes 42 and eight outer cleaning brushes 43. The inner brushes 42 and outer brushes 43 are arranged at equi-spaced intervals circumferentially around the carrier disc 5. The inner brushes 42 are on common radius, while the outer brushes 43 are also on a common radius. Both the inner brushes 42 and the outer brushes 43 are of circumferential length, which is longer than their respective radial widths. In this embodiment of the invention the density and/or type of the fibres of the inner brushes 42 is different to the density and/or type of the fibres of the outer brushes 43 for providing two different types of cleaning action on the lens 2 of the laser head 3 by the respective brushes 42 and 43.

The non-reflective band 25, in this embodiment of the invention, is not a continuous band, rather, it is provided by a plurality of non-reflective black opaque segments 45. This, it has been found, is sufficient for the purpose of causing the laser head 3 to be returned from the first radial direction of motion in the direction of the arrow B to the second radial direction of motion in the direction of the arrow C, see FIG. 4, and thus to cause cycling of the laser head 3 in the first and second directions B and C.

Use of the cleaning device 40 is similar to that of the cleaning device 1 of FIGS. 1 to 6.

Figures 12, 13:
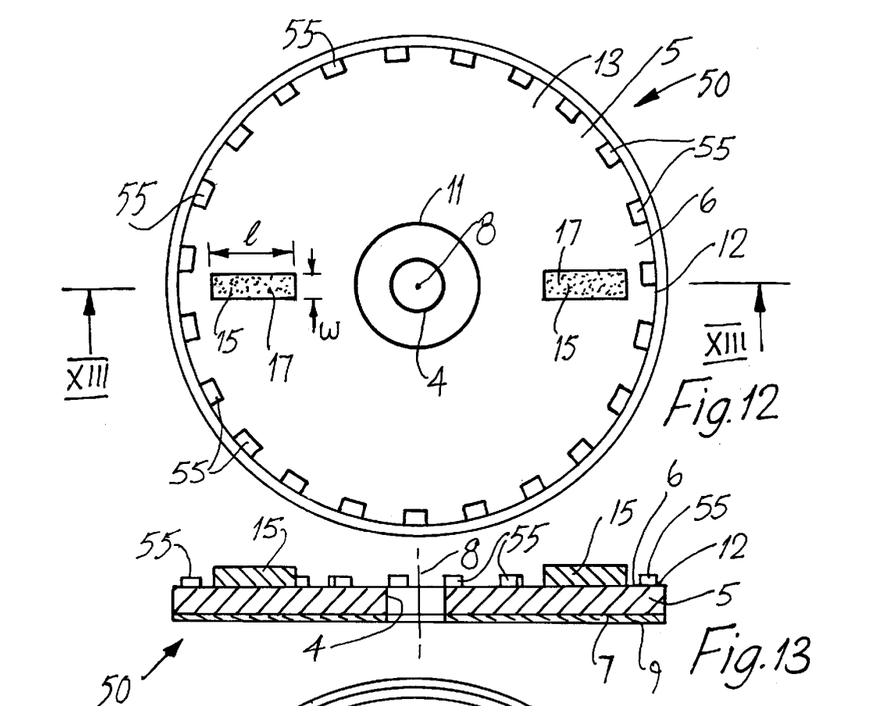
FIG. 12 is a plan view similar to FIG. 1 of a cleaning device according to another embodiment of the invention.
FIG. 13 is a sectional side elevational view similar to FIG. 2 of the cleaning device of FIG. 12 on the line XIII—XIII of FIG. 12.

Referring now to FIGS. 12 and 13 there is illustrated a cleaning device 50 according to a further embodiment of the invention for cleaning a lens 2 of a laser head 3 of a compact disc player. The cleaning device 50 is substantially similar to the cleaning device 1 and similar components are identified by the same reference numerals. The main difference between the cleaning device 50 and the cleaning device 1 is that the cleaning means comprises a pair of cleaning brushes 15 which are located on a common radius and are equi-spaced circumferentially around the carrier disc 5. The brushes 15 are of dimension 1 in a radial direction which is greater than their dimension w in a circumferential direction. In this embodiment of the invention the non-reflective means, instead of being provided by a non-reflective band, is provided by a plurality of non-reflective black opaque segments 55 printed onto the front face 6 of the carrier disc 5. The non-reflective segments 55 are located at equi-spaced apart intervals around the outer periphery 12. The arrangement of the segments 55, it has been found is sufficient for causing the laser head 3 to be returned towards the inner periphery 11, and thus, to cause cycling of the laser head 3 in the first and second directions B and C.

Use of the cleaning device 50 is similar to that of the cleaning device 1.

Figures 14, 15:
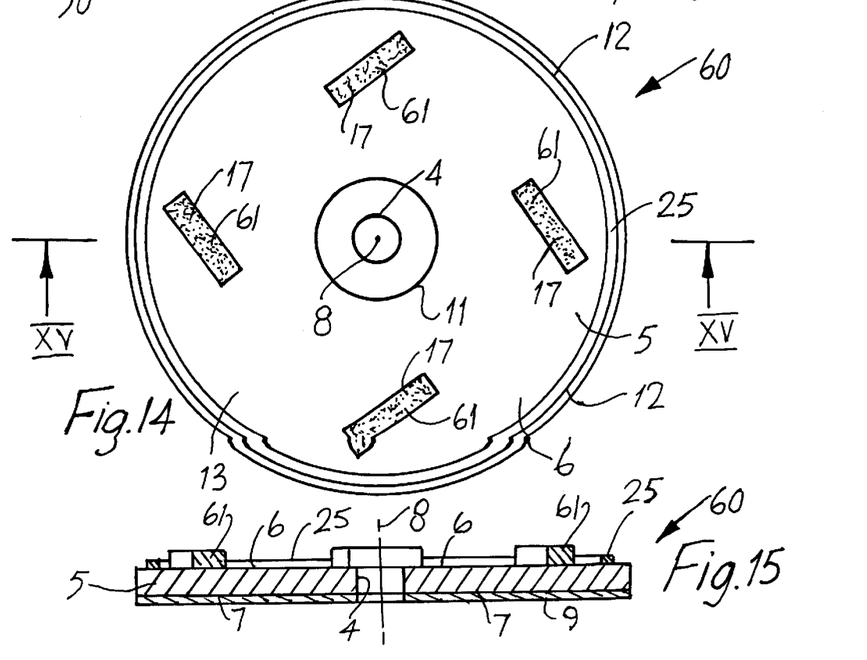
FIG. 14 is a plan view similar to FIG. 1 of a cleaning device according to a still further embodiment of the invention.
FIG. 15 is a sectional side elevational view similar to FIG. 2 of the cleaning device of FIG. 14 on the line XV—XV of FIG. 14.

Referring now to FIGS. 14 and 15 there is illustrated a cleaning device 60 according to a further embodiment of the invention for cleaning a lens 2 of a laser head 3 of a compact disc player. The cleaning device 60 is substantially similar to the cleaning device 1 and similar components are identified by the same reference numerals. The main difference between the cleaning device 60 and the cleaning device 1 is in the arrangement of the cleaning brushes 61. Four cleaning brushes 61 are provided at equi-spaced intervals circumferentially around the carrier disc, and in this embodiment of the invention the cleaning brushes 61 are not of arcuate shape when view in plan, but rather are of rectangular shape. The brushes 61 are arranged to extend at an angle of approximately 45° to a radius extending to a centre point in the brushes 61. Otherwise, the cleaning device 60 is similar to the cleaning device 1, and use of the cleaning device 60 is similar to that of the cleaning device 1.

Figure 16:
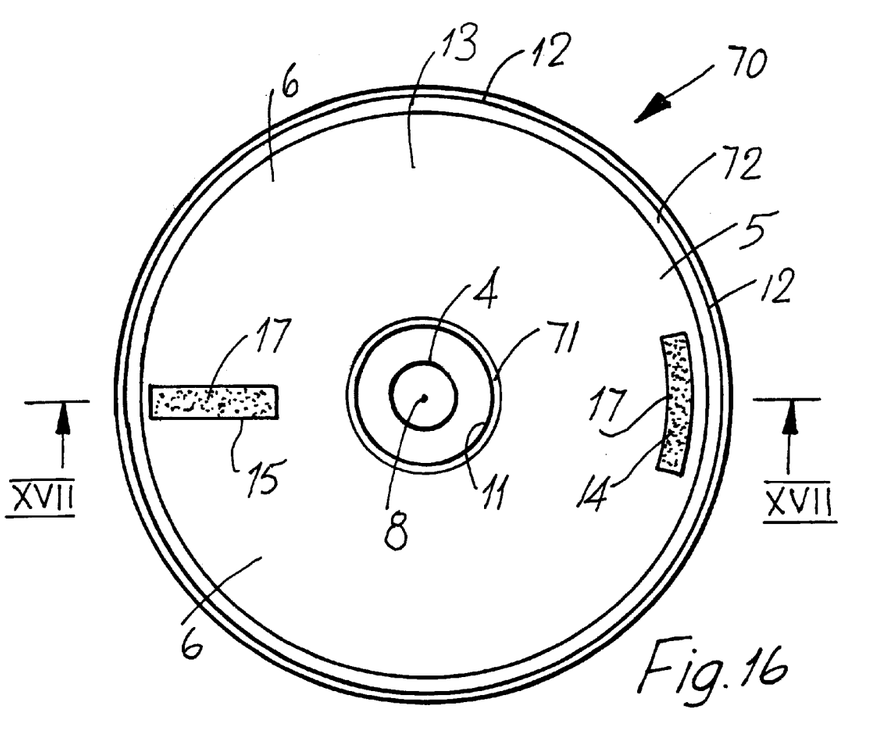
FIG. 16 is a view similar to FIG. 1 of a cleaning device according to a further embodiment of the invention.
Figure 17:
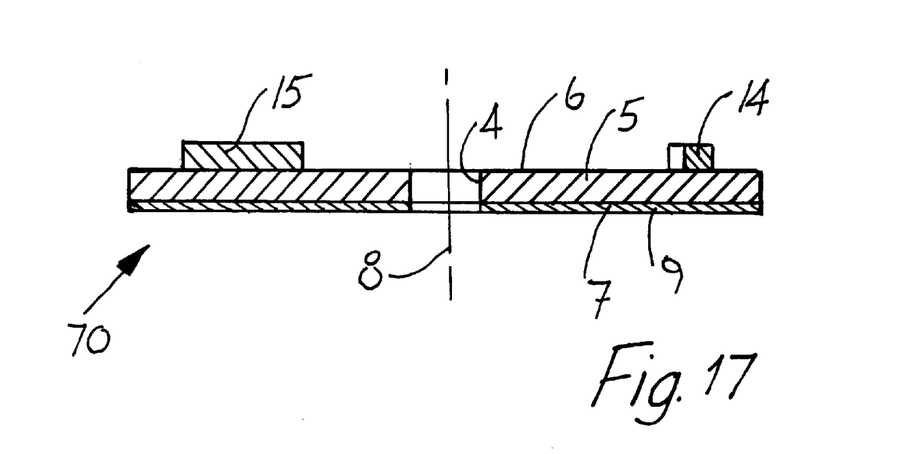
FIG. 17 is a sectional side elevational view similar to FIG. 2 of the cleaning device of FIG. 16 on the line XVII—XVII of FIG. 16.

Referring now to FIGS. 16 and 17, there is illustrated a cleaning device 70 according to a still further embodiment of the invention for cleaning the lens 2 of an optical head 3 of a CD-ROM reader. In this embodiment of the invention the cleaning device 70 is substantially similar to the cleaning device 1, and similar components are identified by the same reference numerals. The main difference between the cleaning device 70 and the cleaning device 1 is that the means for causing the optical head 3 of the CD-ROM reader to move in the first and second radial directions comprises an instruction means, which is provided by first and second instructions at first and second locations, respectively, namely, an inner instruction location 71 and an outer instruction location 72 which are respectively located adjacent the inner periphery 11 and the outer periphery 12 of the annular area 13. The inner location 71 contains a plurality of the first instructions for instructing the optical head of the CD-ROM reader to move in the first radial direction from the inner location 71 to the outer location 72. The first instructions are spaced apart along the inner location 71. The outer location 72 contains a plurality of the second instructions at spaced apart intervals for instructing the optical head to move in the second radial direction back towards the inner periphery 11 to the inner location 71. Accordingly, the optical head 3 is caused by the first and second instructions on the inner location 71 and the outer location 72, respectively, to cycle inwardly and outwardly between the inner and outer locations 71 and 72 across the cleaning paths described by the cleaning brushes 14 and 15, in substantially similar fashion as the laser head 3 is caused to cycle across the cleaning paths described by the brushes 14 and 15 of the cleaning device 1. This inward and outward radial movement of the optical head causes the cleaning brushes 14 and 15 to clean the lens of the optical head in an identical fashion as that described with reference to the cleaning device 1. In other words, the cleaning brushes 14 and 15 and the optical head move with relative movement in a first direction, namely, in the direction of the arrow D, and in a second direction in the direction of the arrow E for cleaning of the lens of the optical head, see FIG. 4.

In use, the cleaning device 70 is inserted in the optical disc receiving location of the CD-ROM reader, and the CD-ROM reader is instructed to read the first instruction on the inner location 71, which thus, initiates the cleaning action already described.

Referring now to FIGS. 18 and 19 there is illustrated a cleaning device 80 according to a still further embodiment of the invention for cleaning a lens of an optical head of a CD-ROM reader. The cleaning device 80 is substantially similar to the cleaning device 1 and similar components are identified by the same reference numerals. The main differences between this cleaning device 80 and the cleaning device 1 is that the cleaning means is provided by an annular brush 81 which extends completely around the carrier disc 5 intermediate the inner periphery 11 and the outer periphery 12. The means for causing a change in relative movement between the optical head and the brush 81 comprises a plurality of first and second instructions on inner and outer locations 82 and 83, respectively, which are located adjacent the inner periphery 11 and the outer periphery 12, respectively, and are substantially identical to the inner and outer locations 71 and 72 of the cleaning device 70. The first and second instructions on the inner and outer locations 82 and 83, respectively, also instruct the optical head to move between the inner and outer locations 82 and 83 for causing the optical head to move across the brush 81 for cleaning of the lens as already described.

Operation of the cleaning device 80 is substantially similar to that already described with reference to the cleaning device 70.

While the cleaning devices have been described as comprising cleaning means, which comprise brushes, any other suitable cleaning means may be provided. Needless to say, any number of brushes may be provided, and where more than one cleaning means is provided, it is desirable that the cleaning means be arranged at equi-spaced intervals circumferentially around the carrier disc. It will also be appreciated that while the carrier means has been described as being a carrier disc, any other suitable carrier means for carrying the cleaning means may be provided.

Additionally, it is envisaged that the cleaning means may be a non-contact cleaning means which may be provided on the carrier means and may be of the type which would draw dust from the optical head by static electricity. Alternatively, the non-contact cleaning means may be of the type which would either suck or blow dust from the optical head, for example, by providing a vacuum for sucking or pressure for blowing the dust. Such a non-contact cleaning means, may be provided by fins or the like on the carrier means, so that as the carrier means is rotated, the fins would create the necessary vacuum or pressure for sucking or blowing dust from the optical head. Such fins, may, for example, be provided by film members secured to the front face of the carrier means. It is also envisaged that a collecting means may be provided on the carrier means for collecting dust removed from the optical head, such a collecting means, may, for example, be provided by an area of the carrier means which may be electro-statically charged to attract the dust. Typically, the collecting means would be provided adjacent the cleaning means, but in general, would be provided in a downstream direction from the cleaning means relative to the relative movement of the cleaning means and the optical head in the first and second directions. Indeed, it is envisaged that an electro-statically charged area on the carrier means could, as well as acting as the collecting means, also act as a non-contact cleaning means. It is envisaged that the cleaning means, whether a non-contact cleaning means or a contact cleaning means, may be secured to the carrier means by a transfer adhesive. It is also envisaged that where the non-contact cleaning means is provided by one or more fins, the dust collecting means may be located on the fins. It is also envisaged that where the cleaning means is a non-contact cleaning means, and is to be provided by an electro-statically charged area for drawing dust electro-statically from the optical head, the cleaning means may be provided by film material which would be secured to the carrier means in the form of an arch, having an upper arcuate apex, which would be electro-statically charged for drawing the dust from the optical head. The height of the arcuate apex above the surface of the carrier means, would be such as to, in general, prevent contact between the optical head and the cleaning means, although, in certain cases, it is envisaged that light contact may occur between the film material and the optical head.

It will be appreciated that in certain cases the means for causing the laser head to cycle relative to the circumferential path of the cleaning means may be provided by the cleaning means itself. It is envisaged in certain cases that the cleaning means, be they brushes, or otherwise may be arranged in a suitable arrangement so that when the optical head reaches the cleaning means it determines an error signal, due to the absence of reflected light, thus returning the optical head to the inner periphery of the annular area of the carrier disc. In such cases, it is envisaged that the optical head would move a sufficient distance towards the outer periphery of the circumferential cleaning path described by the cleaning means to provide sufficient relative movement between the optical head and the cleaning means in the first and second directions.

While in the embodiments of the invention described, the means for preventing reflection of light from the carrier disc to the optical head has been described as being a non-reflective means, which effectively prevents reflection of all light, it will be appreciated that any other suitable means may be provided which may reflect some light, but the amount of light reflected to the optical head would be insufficient for providing a readable signal to the optical head, and thereby, causing the optical head to return to the inner data track. It is also envisaged that the non-reflective means may be provided by removing some of the reflective medium from the rear surface of the carrier means. This would also be sufficient for preventing the reflection of sufficient light from the carrier means so that a readable signal is not received by the optical head.

The length of the non-reflective means in a circumferential direction relative to the central axis of the carrier disc may vary. However, it is important that the circumferential length of the non-reflective means should be such as to prevent the optical head receiving a readable signal for a sufficient period of time to cause the optical head to return to the inner data track to check if the track to which the optical head has been sent does exist. In certain cases, it is envisaged that it may be sufficient to provide the non-reflective means over the portion of the relevant track to merely cover the track number of the relevant track. In which case, the non-reflective means would only have to cover the area of the track which contains the coded data which identifies the track number of the relevant track. For example, if the track to be selected is track IX, as described in the cleaning device of FIGS. 1 to 6, it may be necessary only to cover the coded data on track IX which identifies track IX as being "track IX". In other words, the area of the non-reflective means could be the size of a relatively small dot.

It is also envisaged that in the case of the cleaning device of FIGS. 7 and 8, this cleaning device may operate in certain compact disc players by selecting a track number which exists on the carrier disc, and which is of number greater than track number V. For example, the compact disc player may be instructed to play track number VIII. In which case, it is envisaged that the laser head would proceed from the inner data track to track number VIII, but on encountering the absence of a signal from track number V would be caused to return to the inner data track. This, it is envisaged in certain compact disc players may cause cycling of the laser head in the first and second directions.

While the cleaning brushes have been described as being equi-spaced around the carrier disc, this is not essential.

It is important that either the location, and orientation of the cleaning brush or brushes on the carrier disc should be such as to ensure that the positions of the optical head and at least one of the cleaning brushes coincide, preferably, on each pass of the optical head across the cleaning paths described by the cleaning brushes. Accordingly, it is desirable that the cleaning means should be of a reasonable dimension in a circumferential direction, irrespective of whether the cleaning means are arranged to extend in a general circumferential direction, or in a radial direction, or otherwise. In particular, it is desirable that the dimension of each cleaning means in a circumferential direction should be sufficient to cause the positions of the optical head, and at least one cleaning means to coincide for cleaning cooperation between the cleaning means and the optical head on at least some of the passes of the optical head across the cleaning path or paths described by the cleaning means, and preferably, the combination of the dimensions of each cleaning means in the circumferential direction and the radial direction should be such as to cause the positions of the optical head and at least one of the cleaning means to coincide for cleaning co-operation between the cleaning means and the optical head during each pass of the optical head across the cleaning paths described by the cleaning means. In cases where the cleaning means is provided by a cleaning brush or brushes, it is desirable that the dimension of each cleaning brush in a circumferential direction should not be less than 1.75 mm, and preferably, it is desirable that the circumferential dimension of each brush should be at least 2.5 mm.

We claim:

1. A cleaning device for cleaning a lens (2) of an optical head (3) of an optical disc player and/or recorder unit, the cleaning device (1) comprising;
    a carrier means (5) for placing in an optical disc receiving location of the optical disc player and/or recorder unit,
    a cleaning means (14,15) associated with the carrier means (5) for cleaning the lens (2) when at least one of the optical head (3) and the cleaning means (14,15) is moved relative to the other with the cleaning means (14,15) co-operating with the optical head (3) for cleaning the lens (2) thereof and
    a means (25,71,72) is provided on the carrier means (5) for causing a change in the relative movement between the optical head (3) and the cleaning means (14,15) 50 that the relative movement between the optical head (3) and the cleaning means (14,15) is initially in a first direction (D), and then in a second direction (E), the second direction (E) being different to the first direction (D).

2. A cleaning device as claimed in claim 1 characterized in that the means (25,71,72) for causing the change in relative movement of the optical head (3) and the cleaning means (14,15) between the first and second directions (D,E) causes the optical head (3) and the cleaning means (14,15) to carry out at least two cycles of relative movement in the first and second directions (D,E).

3. A cleaning device as claimed in claim 1 characterized in that the means (25,71) for causing the change in the direction of relative movement between the optical head (3) and the cleaning means (14,15) between the first and second directions (D,E) comprises a means (25,71) for changing the direction of relative movement from the first direction (D) to the second direction (E), and a means (25,72) for changing the direction of relative movement from the second direction (E) of relative movement to the first direction (D) of relative movement.

4. A cleaning device as claimed in claim 1 characterised in that the means (25,71,72) for changing the direction of relative movement of the optical head (3) and the cleaning means (14,15) between the first and second directions (D,E) comprises a means (25,71,72) for causing the optical disc player and/or recorder unit to change the direction of relative movement of the optical head (3) and the cleaning means (14,15).

5. A cleaning device as claimed in claim 1 characterized in that the carrier means (5) comprises a carrier disc (5) of substantially similar dimensions to those of an optical disc for which the optical disc receiving location is adapted to receive, the carrier disc (5) defining a central axis and being engageable with a drive spindle in the optical disc receiving location of the optical disc player and/or recorder unit with the central axis of the carrier disc (5) coinciding with the rotational axis of the drive spindle for rotation of the carrier disc (5), the cleaning means (14,15) being provided on the carrier disc (5) at a location which is radially between an inner periphery (11) and an outer periphery (12) of an annular area (13) of the carrier disc (5) which corresponds to a normal recorded area of an optical disc, and the cleaning means (14,15) being spaced apart from, the respective inner (11) and outer (12) peripheries.

6. A cleaning device as claimed in claim 5 characterized in that a reflective means (9) for reflecting light from the optical head (3) is provided on the carrier disc (5), and the means (25) for causing the change in relative movement between the optical head (3) and the cleaning means (14,15) between the first and second directions (D,E) comprises a means (25) for preventing reflection of sufficient light from the carrier disc (5) SO that a readable signal is not received by the optical head (3).

7. A cleaning device as claimed in claim 6 characterized in that the non-reflective means (25) is located on the carrier disc (5) between the cleaning means (14,15) and the outer periphery (12) of the carrier disc, the non-reflective means (25) comprising a plurality of spaced apart non-reflective segments (45,55) joined by the non-reflective band (25).

8. A cleaning device as claimed in claim 6 characterised in that the cleaning means (14,15) acts as the means for preventing reflection of light from the carrier disc (5).

9. A cleaning device as claimed in claim 6 characterized in that the means for causing the change in direction of relative movement between the optical head (3) and the cleaning means (14,15) between the first and second directions (D,E) comprises an instruction means in coded form on the carrier disc (5).

10. A cleaning device as claimed in claim 9 characterized in that the instruction means (71,72) comprises first and second instructions (71,72) at respective spaced apart first and second locations (71,72), which are located on the carrier disc (5) on opposite sides of the circumferential cleaning path described by the cleaning means (14,15), the first instruction at the first location (71) causing the optical head (3) to move to the second location (72), and the second instruction at the second location (72) causing the optical head (3) to move to the first location.

11. A cleaning device as claimed in claim 6 characterized in that the means (25) for preventing reflection of light from the carrier disc (5) comprises a non-reflective means (25) on the carrier disc (5).

12. A cleaning device as claimed in claim 6 characterized in that the means (25) for preventing reflection of light from the carrier disc (5) comprises an elongated non-reflective band (25) located on the carrier disc (5) and extending in a generally circumferential direction.

13. A cleaning device as claimed in claim 12 characterized in that the elongated non-reflective band (25) extends completely circumferentially around the carrier disc (5).

14. A cleaning device as claimed in claim 5 characterized in that each means (25) for preventing reflection of light from the carrier disc (5) extends in a circumferential direction relative to the central axis of the carrier disc (5) for a distance of at least 1.75 mm.

15. A cleaning device as claimed in claim 5 characterized in that the: cleaning means (14,15) is located on the annular area (13) between the inner and outer peripheries (11,12).

16. A cleaning device as claimed in claim 5 characterized in that the cleaning means (15) extends in a general radial direction relative to the central axis of the carrier means (5), the cleaning means (15) being of dimension in a radial direction which is greater than its dimension in a circumferential direction relative to the central axis of the carrier means (5).

17. A cleaning device as claimed in claim 5 characterized in that at least one cleaning means (14) of dimension in a circumferential direction greater than its dimension in a radial direction is provided.

18. A cleaning device as claimed in claim 5 characterized in that a plurality of cleaning means (14,15) are spaced apart circumferentially around the carrier means (5).

19. A cleaning device as claimed in claim 5 characterized in that the dimension of each cleaning means (14,15) in a circumferential direction relative to the central axis of the carrier means (5) is at least 1.75 mm.

20. A cleaning device as claimed in claim 5 characterized in that the cleaning means (14,15) is of arcuate shape (14) and extends partly circumferentially around the central axis of the carrier means (5).

21. A cleaning device as claimed in claim 20 characterized in that the cleaning means (14) is of dimension in a circumferential direction which is greater than its dimension in a radial direction relative to the central axis of the carrier means (5).

22. A cleaning device as claimed in claim 1 characterised in that the means (25,71,72) for causing the optical head (3) and the cleaning means (14,15) to move with relative movement in the first and second directions (D,E) causes the optical head (3) and the cleaning means (14,15) to move with relative movement in a direction parallel to the plane of movement of the carrier means (5).

23. A cleaning device as claimed in claim 1 characterized in that the means for causing the optical head (3) and the cleaning means (14,15) to move with relative movement in the first and second directions causes the optical head (3) to move with relative movement in a direction perpendicular to the plane of movement of the carrier means (5) towards and away from the cleaning means (14,15).

24. A cleaning device as claimed in claim 1 characterised in that the means for causing the optical head (3) and the cleaning means (14,15) to move relative to each other in the first and second directions (D,E) causes the optical head (3) to move in a radial direction (B,C) relative to the rotational axis of the carrier means (5).

25. A cleaning device as claimed in claim 1 characterized in that each cleaning means (14,15) comprises a cleaning brush (14,15).

26. A cleaning device as claimed in claim 25 characterized in that each cleaning brush (14,15) comprises a plurality of cleaning fibres (17) extending from a base member (16), the base member (16) being adapted for securing to the carrier means (5).

27. A cleaning device as claimed in claim 25 characterized in that each cleaning brush (14,15) is releasably secured to the carrier means (5).

28. A device as claimed in claim 1 characterised in that the means for causing a change in the relative movement between the optical head 3 and the cleaning means (14,15) is provided by the cleaning means (14,15).

29. In combination an optical disc player and/or recorder unit having an optical head (3) and a lens (2) associated with the optical head (3) and an optical disc receiving location for receiving an optical disc so that the optical head (3) can read from and/or write onto the optical disc, and a cleaning device (1) for cleaning the lens (2) of the optical head (3), the cleaning device (1) comprising a carrier means (5) located in the optical disc receiving location, and a cleaning means (14,15) associated with the carrier means (5) for cleaning the lens (2) when at least one of the optical head (3) and the cleaning means (14,15) is moved relative to the other with the cleaning means (14,15) cooperating with the optical head (3) for cleaning the lens (2) thereof, and a means provided on the carrier means for causing relative movement between the optical head (3) and the cleaning means (14,15) initially in a first direction (1), and then is in a second direction (E), the second direction (E) being different to the first direction (D).

30. A cleaning device for cleaning a lens (2) of an optical head (3) of an optical disc player and/or recorder unit, the cleaning device (1) comprising:

a carrier disc (5) for placing in an optical disc receiving location of the optical disc player and/or recorder unit, the carrier disc (5) being of substantially similar dimensions to those of an optical disc for which the optical disc receiving location is adapted to receive, a reflective means (9) being provided on the carrier disc (5) for reflecting light from the optical head (3), a cleaning means (14,15) associated with the carrier means (5) for cleaning the lens (2) when at least one of the optical head (3) and the cleaning means (14,15) is moved relative to the other with the cleaning means (14,15) cooperating with the optical head (3) for cleaning lens (2) thereof the cleaning means (14,15) acting as a means for preventing reflection of light from the carrier disc (5) for causing a change in the relative movement between the optical head (3) and the cleaning means (14,15) 50 that the relative movement between the optical head (3) and the cleaning means (14,15) is initially in a first direction (D), and then in a second direction (E), the second direction (E) being different to the first direction (D).

31. A method for cleaning a lens (2) of an optical head (3) of an optical disc player and/or recorder unit, the method comprising the steps of inserting a cleaning device (1) into an optical disc receiving location of the player/recorder unit, wherein the cleaning device (1) comprises:

a carrier means (5) for placing in the optical disc receiving location of the optical disc player and/or recorder unit, a cleaning means (14,15) associated with the carrier means (5) for cleaning the lens (2) when at least one of the optical head (3) and the cleaning means (14,15) is moved relative to the other with the cleaning means (14,15) cooperating with the optical head (3) for cleaning the lens (2) thereof and a means (25,71,72) provided on the carrier means (5) for causing a change in the relative movement between the optical head (3) and the cleaning means (14,15) 50 that the relative movement between the optical head (3) and the cleaning means (14,15) is initially in a first direction (D), and then in a second direction (E), the second direction E) being different to the first direction (D), the method comprising the further step of activating the optical disc player and/or recorder unit to urge the optical head of the optical disc player and/or recorder unit to move relative to the cleaning device (1) so that the direction of relative movement between the optical head (3) and the cleaning means (14,15) is initially in the first direction (), and then in the second direction (E).

32. A method as claimed in claim 31 characterised in that at least one of the optical head (3) and the cleaning means (14,15) is moved relative to the other for causing at least two cycles of relative movement in the first direction (D) and the second direction (E).

33. A method as claimed in claim 31 characterised in that the carrier means (5) is rotated in the optical disc receiving location about an axis of rotation by a drive spindle in the optical disc receiving location for causing the cleaning means (14,15) to describe a circumferential cleaning path of movement (A) extending around the rotational axis of the carrier means (5).

34. A method as claimed in claim 33 characterized in that an instruction provided on the carrier means (5) instructs the optical head (3) to move to a predetermined location on the carrier means (5), for causing the optical head (3) to move across the circumferential path described by the cleaning means (14,15) for providing the relative movement in the first direction (D), and a further instruction provided on the carrier means (5) returns the optical head (3) from the predetermined location to return across the circumferential path described by the cleaning means (14,15) for providing the relative movement in the second direction (E), the further instruction being such as to cause the optical disc player and/or recorder unit to cycle the optical head (3) across the cleaning path described by the cleaning means (14,15) for causing cycling of the relative movement in the first and second directions (D,E).

35. A method as claimed in claim 1 characterised in that the optical head (3) is moved in a radial direction (B,C) relative to the rotational axis of the carrier means (5), the optical head (3) being initially moved in a first radial direction (B) for providing the relative movement in the first direction (D) between the optical head (3) and the cleaning means (14,15), the optical head (3) then being moved in a second radial direction (C) opposite to the first radial direction (B) for providing the relative movement in the second direction (E).

36. A method as claimed in claim 31 characterized in that at least one of the optical head (3) and the cleaning means (14,15) is moved transversely relative to the plane of movement of the carrier means (5) for providing the relative movement between the optical head (3) and the cleaning means (14,15) in the first and second directions (F,G), the relative movement between the optical head (3) and the cleaning means (14,15) in the first and second directions (F,G) causing the optical head (3) to move into and out of the cleaning means (14,15).

* * * * *